United States Patent [19]
Romans

[11] 3,771,350
[45] Nov. 13, 1973

[54] PIPELINE LEAK DETECTOR
[75] Inventor: Gleason Romans, Tulsa, Okla.
[73] Assignee: Aviation, Inc., Tulsa, Okla.
[22] Filed: Dec. 30, 1971
[21] Appl. No.: 213,984

[52] U.S. Cl............... 73/40.5 R, 73/154, 250/256, 250/268, 250/338, 250/347
[51] Int. Cl........................... G01m 3/04, G01t 1/16
[58] Field of Search.................. 73/40, 40.5 R, 154; 250/43.5 FC, 83.6 W, 83.3 H

[56] References Cited
UNITED STATES PATENTS

| | | | |
|---|---|---|---|
| 3,656,344 | 4/1972 | Johns | 73/154 |
| 3,363,457 | 1/1968 | Ruehle | 73/154 |
| 3,162,505 | 12/1964 | Hall | 73/40.5 R |
| 3,004,162 | 10/1961 | Menke | 250/83.3 H |
| 3,258,602 | 6/1966 | Promish | 250/83.3 H |
| 2,818,508 | 12/1957 | Johanson | 250/83.3 H |

Primary Examiner—James W. Lawrence
Attorney—William S. Dorman

[57] ABSTRACT

A pipeline leak detector comprising a cylindrical housing which is propelled through a pipeline by the flow of fluid therein. An infra red scanning means disposed in the housing for collecting infra red emission from the inner walls of the pipe, an optical focusing means in communication with the scanning means for focusing the infra red emission on a cryogenically cooled detector which is also disposed within the housing. Converter means converts the infra red emission into an electrical voltage which is directly proportional to the frequency of the emission. A continuous recording means is operably connected to the detector means for recording the voltage output thereof, whereby the temperature differential caused by fluid escaping from a pipeline leak is recorded for subsequent determination of the location of the leak.

7 Claims, 4 Drawing Figures

PATENTED NOV 13 1973 3,771,350
INVENTOR.
Gleason Romans
BY William S. Dorman
ATTORNEY
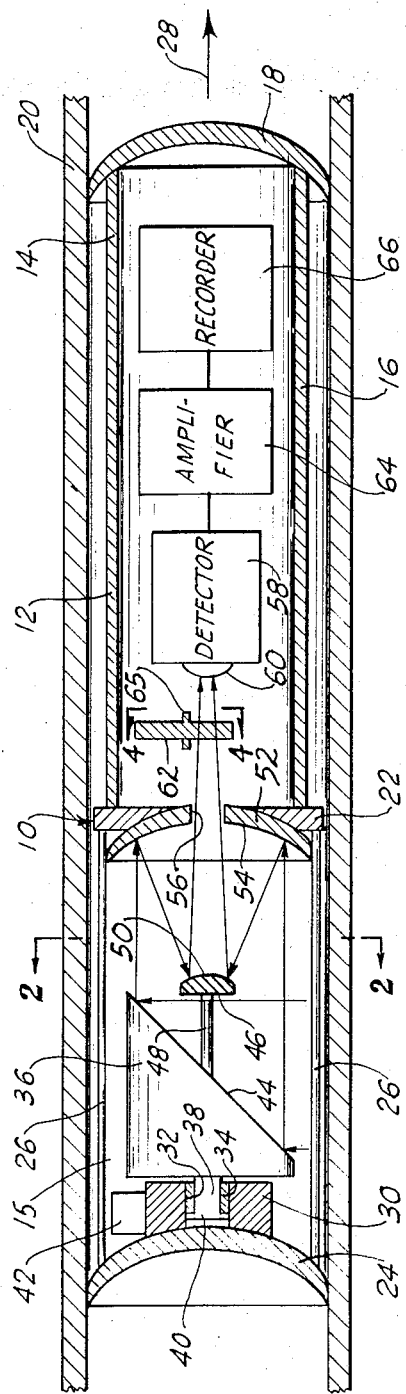
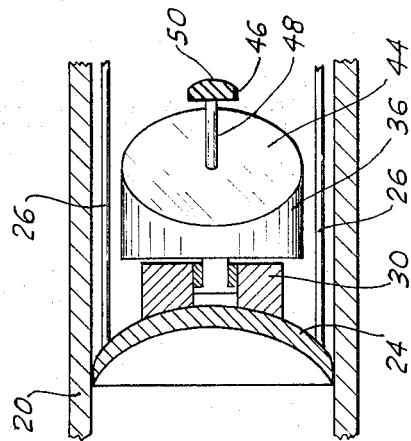
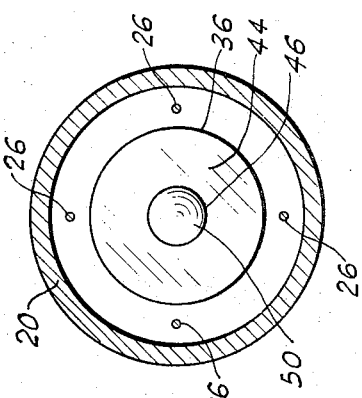
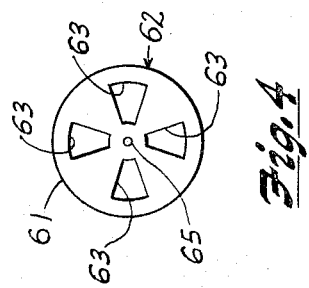

3,771,350

PIPELINE LEAK DETECTOR

FIELD OF THE INVENTION

The present invention relates to a means for detecting and locating leaks in fluid carrying pipelines and more particularly, but not by way of limitation, to a pipeline leak detector which detects abrupt temperatre changes caused by fluid escaping through a hole in the pipeline by infra red detecting means.

BACKGROUND OF THE INVENTION

The detection and location of leaks in pipelines, whether buried or above the ground, is extremely important and has always been a problem in the industry. There are leak detecting devices presently in use which utilize pressure differential measurements in locating or determining the presence of a leak, such as the Pritchett U.S. Pat. No. 3,132,506, issued May 12, 1964, and entitled "Leak Detector for Fluid Conductors." However, the present day devices of this type are subject to many false alarms caused by out-of-round conditions of the pipe which may create an indication of pressure change at a position along the pipeline where there is no leak. In addition, leak detectors which rely on the ultrasound emission caused from fluid escaping are presently used, such as the Bosselaar U.S. Pat. No. 3,575,040, issued Apr. 13, 1971, and entitled "Apparatus for Testing a Pipeline for Leaks." This type of detector usually requires that said ultrasound devices be used in conjunction with pressure sensing devices to eliminate false alarms caused by external noise and for detecting low pressure conditions wherein the escaping fluid would not generate an ultrasonic signal.

SUMMARY OF THE INVENTION

The present invention contemplates a novel leak detecting device which continually scans the inner wall of the pipe under inspection for minute and abrupt temperature fluctuations caused by the fluid escaping through a hole in the pipe. The temperature change is caused not so much by a difference in pressure of the fluid within the pipe, but from the rapid reduction of the pressure of the escaping fluid as it exits the pipe. Hence, false alarms of the presence of a leak will be greatly reduced or substantially eliminated. Time correlation, volume measurements or odometer devices may be used in conjunction with the present invention for locating the leaks which are indicated by inspection of the strip recording.

Other and further advantageous features of the present invention will hereinafter more fully appear in connection with a detailed description of the drawings in which:

DRAWING DESCRIPTION

FIG. 1 is an elevational view, partly in section, of the leak detecting apparatus embodying the invention and disposed in a pipeline.

FIG. 2 is a sectional view taken along the line 2—2 of FIG. 1.

FIG. 3 is an elevational view partly in section depicting the scanning mirror of FIG. 1 as viewed at 90° with respect to the view of FIG. 1.

FIG. 4 is an elevational view of the chopper means taken along the line 4—4 of FIG. 1 and rotated 45°.

DETAILED DESCRIPTION

Referring to the drawings in detail, reference character 10 generally indicates a pipeline leak detector for locating fluid leaks in pipelines comprising a substantially cylindrical housing 12 which may be longitudinally moved through a pipeline by the fluid being passed therethrough, as is well known. The housing 12 is comprised of two compartments, the first compartment 14 for containing the electronic components of the apparatus and a second compartment 15 for housing the optical components thereof. The compartment 14 comprises an elongated cylindrical member 16 having a substantially round cup shaped end piece 18 rigidly secured to one end of the member 16. The member 18 is preferably yieldable, as is well known, and the diameter of the end piece 18 is substantially equal to the inside diameter of the pipe 20 thereby creating a seal such that the fluid being carried through the pipe 20 is not permitted to leak past the said end piece 18. An annular plate 22 is secured to the opposite end of the member 18. A second cup shaped end piece 24 generally similar to the end piece 18 is disposed within the pipe 20 and spaced from the plate 22, said end piece 24 being rigidly attached to the plate 22 by a plurality of elongated connnecting rods 26. Likewise, the end piece 24 provides a seal whereby the fluid in the pipe 20 is not permitted to pass into the housing 12. Therefore, since the leak detector 10 is longitudinally passed through the pipe 20 in the direction indicated by the arrow 28, the fluid forward of the housing 12 is separated from the fluid behind the said housing thereby creating a "dry" space between the end pieces 18 and 24. A cylindrical scanning mirror mount 30 is rigidly secured to the convex side of the end piece 24, said mount 30 having a centrally disposed longitudinal bore 32 therein, the inner walls of said bore 32 having a cylindrical bushing 34 disposed therein. A SUBSTANTIALLY cylindrical rotatable mirror base 36 is concentrically disposed within the housing 12, and rotatably attached to the mount 30 in any well known manner (not shown). The forward end of the mirror holder 36 is truncated at approximately 45° with respect to the longitudinal axis thereof. The opposite end of the said holder 36 is provided with a centrally disposed longitudinal axle 38 secured thereto, in any suitable manner, said axle being journalled within the bushing 34. The outer end of the axle 38 is provided with a flange 40 for retaining said axle within the bore 32. A drive motor 42 is secured to the mount 30 and is operably connected to the axle 38 in any well known manner (not shown) for rotating the said holder 36 about its longitudinal axis. The truncated end of the holder 36 is provided with a flat elliptical mirror 44 capable of receiving infra red (IR) emission from the inside surface of the pipe 20 and reflecting said IR emission longitudinally along the inside of the housing 12 for purposes as will be hereinafter set forth.

A small cylindrical mirror mount 46 is concentrically disposed within the housing and is spaced from the mirror 44 by means of a longitudinal rod 48 having one end thereof secured to the holder 36 through the mirror 44 and the opposite end secured to one end of the mirror mount 46. The opposite end of the mirror mount 46 is provided with a circular convex mirror 50. A parabolic shaped mirror mount 52 is secured to the annular plate 22 with the parabolic concave face 54 thereof being mirrored and disposed in a manner as to face the convex mirror 50. A centrally disposed longitudinal bore 56 is provided through the mirror mount 52.

An IR detector means 58 having a suitable semiconductor receiver head 60 for receiving IR emission is disposed within the cylindrical member 16 of the housing 12. The detector means 58 is also provided with a cryogenic coolant to increase the sensitivity of the receiving head 60 to the received IR emission. A mechanical chopper 62 is interposed between the bore 56 and the detector means 58 for intermittently interrupting the IR emission so that the detector will receive pulsating IR emission. The chopper 62 comprises a circular opaque disc 61, the plane of said disc 61 being disposed at a right angle to the longitudinal axes of the housing 12, the said disc having a rotating axle 65 centrally disposed therein, the axle 65 rotatably disposed in the housing in any well known manner. The chopper 62 is provided with a plurality of radial openings 63 for intermittently allowing the IR emission therethrough during rotation. The IR emission is then converted to an electrical pulsating signal in the detector means 58 by any well known electrical circuit (not shown), said electrical pulsating signal having a voltage level directly proportional to the frequency of the IR emission received. It is noted that the frequency of the IR emission will be directly proportional to the temperature of the internal walls of the pipeline being inspected for leaks. The electrical pulsating signal is then provided as an input to an amplifier 64 for increasing the voltage level of said signal. A continuous strip chart recorder 66 is operably connected to the output of the amplifier 64 for recording the electrical signal. The chopper 62, the detector means 58, the amplifier 64 and the recorder 66 are secured in any well known manner to the inside wall of the cylindrical member 16 of the housing 12 and are provided with electrical power such as a battery pack (not shown).

In operation, the pipeline leak detector 10 is assembled generally as described above and shown in FIG. 1. The detector means 58 is provided with sufficient coolant to reduce the temperature of the receiving detector head 60. The motor 42 is connnected to an internal power source (not shown) and is engaged with the axle 38 of the mirror mount 36 to effect rotation thereof. The rotational speed of the holder 36 in relation to the longitudinal velocity of the fluid being passed through the pipe should be such that the holder 36 will make one complete revolution in less time than it takes the housing to longitudinally travel a distance equal to the diameter of the holder 36 thereby assuring that there is complete scan coverage of the entire inner surface of the pipe being inspected.

The pipeline leak detector 10 is then inserted into the flow of fluid in any well known manner. As the apparatus travels along the pipe, the rotating mirror 44 will receive the IR emission from the interior walls of the pipe and reflect the said emission from the interior walls of the pipe and reflect the said emission to the parabolic collecting mirror 54. The IR emission will then be reflected divergently to the surface of the mirror 50 where the IR emission will then be reflected through the bore 56 and further through the chopper 62 to the detector head 60. Then, as hereinbefore set forth, the IR emission will be converted into an electrical signal, that signal in turn being amplified and recorded on the strip chart recorder 66. At the end of the run, the leak detector 10 will be removed from the pipeline and the strip chart recording may be examined to determine if there are any abrupt temperature fluctuations indicating a pipeline leak. Any such temperature fluctuations discovered may then be correlated by time and distance to the location of the detector 10 at the time of detecting said fluctuation by any well known method.

What is claimed is:

1. A pipeline leak detector comprising a cylindrical housing propelled through a pipeline by the flow of fluid therethrough, infrared (IR) scanning means disposed in the housing for collecting IR emission from the inner wall of the pipe, optical focus means in communication with the scanning means for directing and focusing the IR emission, detector means in communication with the focusing means for detecting the IR emission and converting said emission into an electrical voltage proportional to the frequency of the emission (which is also proportional to the temperature at the emission), and a continuous recording means operably connected to the detector means for recording the voltage output thereof whereby any temperature differential caused by fluid escaping from a pipeline leak is recorded for permitting location of the said leak.

2. A pipeline leak detector comprising a cylindrical housing propelled through a pipeline by the flow of fluid therethrough as set forth in claim 1 wherein said housing comprises a first compartment for housing the detector and recording means and a second adjacent compartment in longitudinal alignment with the first compartment and in substantially open communication with the inner wall of the pipeline for housing the scanning means and optical focusing means, each outer end of the said housing being provided with a hemispherical sealing means, the convex face of each sealing means facing the direction of travel of the housing within the pipeline for sealing off the fluid from within said housing and effecting the propelling of said housing through the pipeline by the flow of fluid.

3. A pipeline leak detector comprising a cylindrical housing propelled through a pipeline by the flow of fluid therethrough as set forth in claim 2 wherein the optical scanning means comprises a flat 45° elliptical shaped scanning mirror rotatably disposed within the second compartment, the plane thereof being at approximately 45° with respect to the longitudinal axis of the cylindrical housing and having its axis of rotation coinciding with the said longitudinal axis of the cylindrical housing whereby the IR emission from the walls of the pipe which strike the scanning mirror at an angle of 45° with respect thereto are reflected along the housing to the optical focusing means.

4. A pipeline leak detector comprising a cylindrical housing propelled through a pipeline by the flow of fluid therethrough as set forth in claim 2 wherein the optical focusing means comprises a firsr concave parabolic mirror centrally disposed between the first and second compartments having the face thereof disposed to collect reflected IR emission from the scanning means, the outside diameter of said parabolic mirror being complementary to the inside diameter of the pipe, said parabolic mirror being provided with a centrally disposed longitudinal bore therethrough, and a second convex mirror having a diameter substantially smaller than the parabolic mirror, said convex mirror being centrally disposed within the second compartment between the scanning means and the parabolic mirror, the convex mirror facing the parabolic mirror whereby the IR emission from the scanning means is reflected to the parabolic mirror where said IR emission is again reflected divergently to the convex mirror and is in turn reflected through the longitudinal bore in the parabolic mirror to the detector means.

5. A pipeline leak detector comprising a cylindrical housing propelled through a pipeline by the flow of fluid therethrough as set forth in claim 2 wherein the detector means comprises a detector head which is centrally disposed within the first compartment at a position for detecting the focused IR emission from the optical focusing means, a cryogenic coolant chamber in communication with the detector head for increasing the sensitivity of the head to IR emission and convertor means for producing electrical voltage proportional to the frequency of the received IR emission.

6. A pipeline leak detector comprising a cylindrical housing propelled through a pipeline by the flow of fluid therethrough as set forth in claim 3 wherein the optical focusing means comprises a first concave parabolic mirror centrally disposed between the first and second compartments having the face thereof disposed to collect reflected IR emission from the scanning means, the outside diameter of the said parabolic mirror being complementary to the inside diameter of the pipe, said parabolic mirror being provided with a centrally disposed longitudinal bore therethrough, and a second convex mirror having a diameter substantially smaller than the parabolic mirror said convex mirror being centrally disposed within the second compartment between the scanning means and the parabolic mirror, the convex mirror facing the parabolic mirror whereby the IR emission from the scanning means is reflected divergently to the convex mirror and is in turn reflected through the longitudinal bore in the parabolic mirror to the detector means, and wherein the detector means comprises a detector head which is centrally disposed within the first compartment at a position for detecting the focused IR emission from the optical focusing means, a cryogenic coolant chamber in communication with the detector head for increasing the sensitivity of the head to IR emission and convertor means for producing electrical voltage proportional to the frequency of the received IR emission.

7. A pipeline leak detector comprising a cylindrical housing propelled through a pipeline by the flow of fluid therethrough as set forth in claim 6 wherein a mechanical chopper means is interposed between the bore in the parabolic mirror and the detector means to intermittently interrupt the IR emission thereby enhancing the detecting capability of the detector means.

* * * * *